United States Patent Office 3,002,886
Patented Oct. 3, 1961

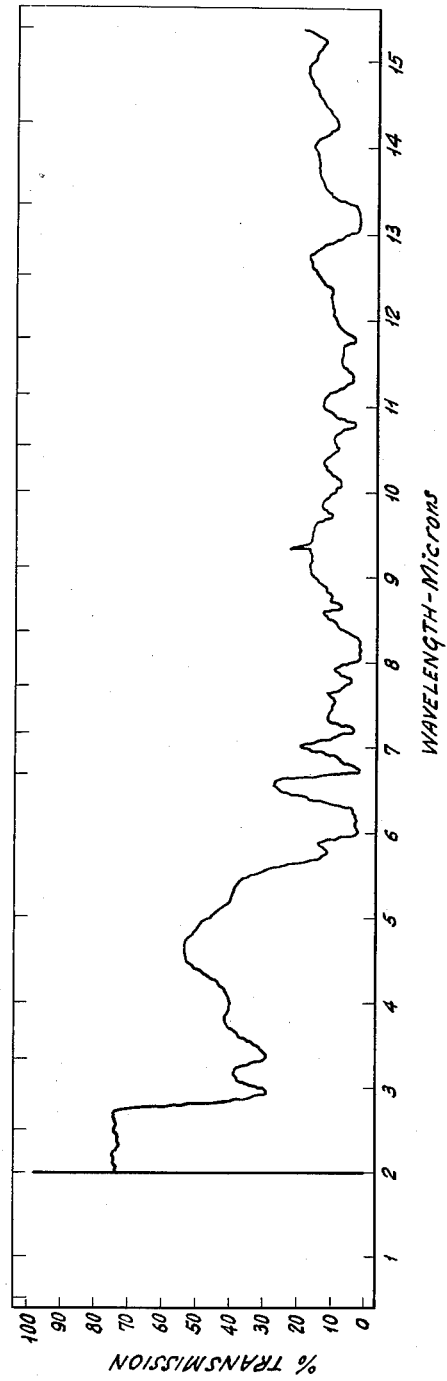

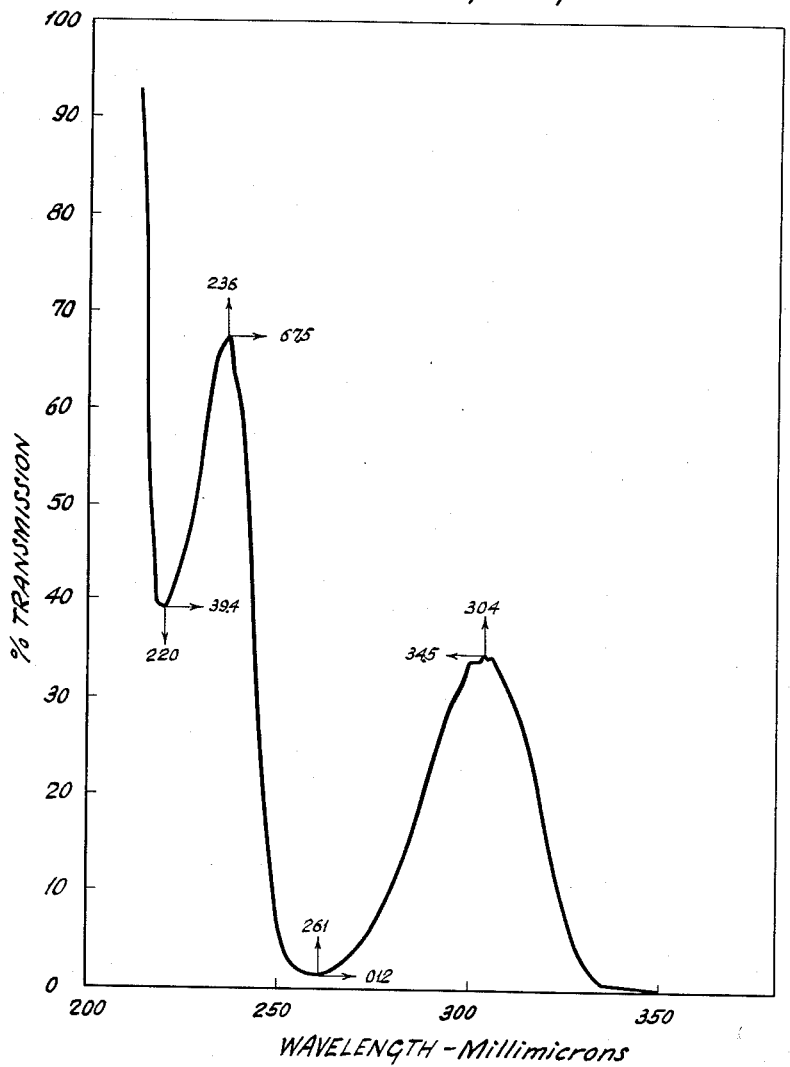

3,002,886
BETAINE SALICYLATES AND THE METHOD FOR THEIR PREPARATION
Alfred Halpern, Great Neck, N.Y., assignor to Synergistics, Inc., New York, N.Y., a corporation of New York
Filed Mar. 3, 1958, Ser. No. 718,543
9 Claims. (Cl. 167—65)

The present invention relates to new derivatives of salicyclic acid which are useful for therapeutic purposes, the means of preparing the same and their incorporation into dosage forms for administration to humans and animals. Covered as well is the method of elevating blood salicylate levels through the utilization of the new compounds.

While salicylates have been widely used in clinical medicine, many cause gastrointestinal distress. Another limitation resides in the instability of presently available salicylate compounds in aqueous media. Thus, aspirin (acetylsalicylic acid) which is unstable in aqueous solutions, is limited in use to anhydrous solid preparations and hence cannot easily be incorporated into desirable aqueous solutions for pediatric use.

The use of sodium, potassium and ammonium salts to dissolve the normally insoluble salicylic acid, frequently introduces new difficulties arising from the metabolism of these solubilizing ions. The difficulties are increased by reason of the relatively large quantity of salicylates which are administered. For example, the administration of sodium salicylate is contra-indicated for those patients who have cardiovascular disease complicated by water-retention. While the potassium salt may be used in such instances, the large quantities of salicylates generally required frequently exceeds the safe potassium limits for such patients. Ammonia derivatives are also contraindicated because of the possibility of disturbing the acid-base balance of blood.

Salts, such as the aluminum, magnesium and calcium salicylates, interfere with the solubilization of the compound so that they are restricted to solid preparations. Then, too, they are often hygroscopic and hence present stability problems.

Attempts to solve the problem of salicylic acid through the use of organic solubilizing groups has met with little success. Many such organic derivatives are extremely hygroscopic and hence cannot be conveniently used for tableting. Because of the high dosage of salicylates which are utilized in therapy, and the prolonged periods of time for which this medication is administered, the choice of organic component used to combine with salicylic acid becomes extremely important in order to avoid a cumulative toxicity.

In contrast to the limitations of the previously known salicylates, betaine salicylate, the product of this invention, may be administered in large quantities to patients, even those having complications of water retention, without gastrointestinal side-effects or cumulative toxicity.

Betaine is the completely methylated aminoacetic acid or N-trimethylglycine. It is a strongly polar compound having the following structure:

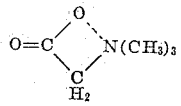

and may be prepared synthetically by the reaction of trichloracetic acid and trimethyl amine. The compound melts at 293° C. and is soluble in water and alcohol. It is capable of acting as a methylating agent for certain biological transmethylating reactions.

Betaine salicylate is a well-defined, white, crystalline compound melting at 107–109° C. resulting from the reaction between betaine and salicylic acid. The compound has a characteristic odor with a slightly sweet astringent taste and analyzes in excellent agreement with the theoretical values for carbon, hydrogen and nitrogen. It exhibits characteristic infra-red and ultra-violet absorption spectra.

The ultra-violet spectrum of betaine salicylate in methanol (see FIG. 2) reveals a characteristic curve with two absorption bands; a sharp absorption band exhibiting a minimum at 220 millimicrons and maximum at 236 millimicrons and a moderately sharp band with minimum at 250 and maximum at 304 millimicrons.

The infra red spectrum of betaine salicylate reproduced in FIG. 1, was obtained using the Perkin-Elmer spectrophotometer employing a sodium chloride prism.

Betaine salicylate is slightly soluble in water (0.74 gram percent at 25° C.), and the pH of the saturated aqueous solution is pH 2.7. The compound is soluble in methanol, ethanol and isopropanol and insoluble in anhydrous ether and petroleum benzine. Betaine salicylate is not hygroscopic and is stable to heat and light. The molecular weight of betaine salicylate is 255.27 and it may be designated as N-trimethylglycine salicylate.

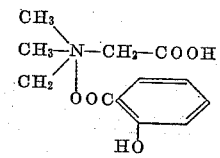

Betaine salicylate is stable to acid solutions and to solutions of weak alkali up to pH 8.5. When betaine salicylate is caused to react with dilute alkaline solutions, the alkaline ion first reacts to form the salt of salicylic acid, while the hydroxide of trimethylglycine is liberated. This latter compound, in turn, will react with additional quantities of alkali to form a metallic salt and water. This buffering property of betaine salicylate adds to the stability of the compound in contrast to the conventional salts derived from other organic bases and is unique for these derivatives. The reaction may be postulated to proceed as follows:

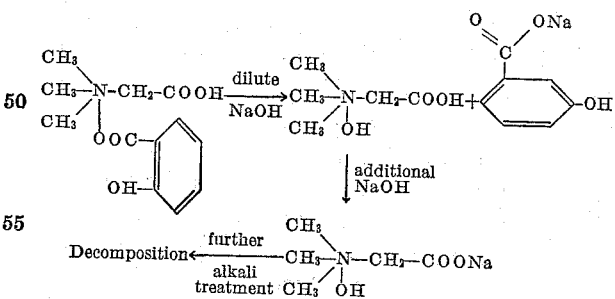

Betaine salicylate is prepared through the interreaction of betaine base and salicylic acid in anhydrous alcoholic medium. The preferred ratios of the reacting ions of betaine and salicylic acid is 1.2:1. The use of the slight excess of the betaine will prevent the formation of an ester through the breaking of the polar bond of the inner anhydride of betaine. The reaction may be conveniently carried out at room temperature, although warming to 50° C. accelerates the rate of reaction. The desired compound is obtained in a high degree of purity by concentrating the reacting mixture and crystallizing the desired compound at reduced temperatures. An important characteristic of the conditions of the reaction is that an essentially anhydrous medium be obtained in order to avoid the formation of an esterification of the anhydride grouping of the betaine by the salicylic acid.

The following examples illustrate the scope of the invention:

Example 1

To a solution of 0.12 mole of betaine, dissolved in one liter of anhydrous isopropanol, is added slowly and with stirring a solution of 1.0 mole of salicylic acid dissolved in 750 cc. of isopropyl alcohol. The stirring is continued while the reaction mixture is warmed to 50° C. for a period of two hours. The solution is then concentrated under reduced pressure to one-tenth of its original volume and then chilled in an ice chest overnight. The white, solid crystalline material is filtered and washed with two 25 cc. portions of anhydrous ether followed by two 25 cc. portions of cold distilled water. The solid material is then dried. The dried betaine salicylate melts at 107–109° C. and consists of moieties of 45.9 percent betaine and 54.1 percent salicylic acid. It analyzes for carbon and hydrogen in good agreement with its theoretical values (percent carbon; theory: 56.5; found: 56.52; percent hydrogen; theory: 6.7; found 6.55; percent nitrogen; theory: 5.5; found 5.41). The yield of product is better than 85 percent.

Example 2

To a solution of one mole of betaine chloride dissolved in one liter of absolute ethanol is added slowly and with stirring, a solution of one mole of sodium salicylate dissolved in one liter of absolute ethanol. The stirring is continued while the reaction mixture is warmed to reflux temperature for a period of four hours. The precipitated sodium chloride is filtered and the clear solution concentrated under reduced pressure to 250 cc. or until crystallization begins. The concentrated solution is then chilled in an ice chest overnight to permit complete crystallization of the betaine salicylate. The white, crystalline compound is filtered and washed with a small quantity of dry ether and then with small portions of cold distilled water and dried. The compound melts at 107–109° C. and corresponds in all other ways to the betaine salicylate isolated as a result of Example 1. The yield of the desired compound resulting from this procedure is better than 80 percent.

Example 3

In place of the isopropyl alcohol used as a solvent in Example 1, and the ethanol used as a solvent in Example 2, there may be substituted any other liquid alcohol of the class ROH, wherein R consists of a straight or branched chain alkyl group containing from one to five carbons. The other steps of the process are exactly as described in Examples 1 and 2.

Example 4

In place of the alcohols used as a solvent in Examples 1, 2 and 3, there may be substituted an inert organic solvent such as benzene or toluene in the amounts described. The remainder of the process should be carried out as described previously, except that the reaction time must be increased by 50 to 100 percent.

Example 5

In place of a betaine chloride described in Example 2, the betaine base moiety may be provided by the substitution of another salt of betaine such as the bromide, nitrate or carbonate. The other steps of this process are the same and the reaction carried out as described above.

Example 6

In place of the sodium salicylate described in Example 2, the salicylic acid moiety may be provided by the substitution of other metallic derivatives of salicylic acid such as the potassium, calcium, magnesium or aluminum salts. When the solvent-insoluble salts are used, a suspension of the metallic salicylate in the solvent results and the reaction-time must be proportionately prolonged. Thus, when either the calcium, magnesium or aluminum salt of salicylic acid are utilized, the reaction time must be prolonged to at least twelve hours. The other steps in the process are the same and the compound resulting is identical to that described in Example 1.

Example 7

When it is desired to use betaine salicylate as a means of elevating the blood level of salicylates for the purpose of treating rheumatic disease or to cause an analgesic effect, they are administered at dosage levels of from 50 to 500 mg., three times daily, dependent upon the particular individual needs of the patient. Unit dosage forms may and should be provided incorporating from 50 to 500 mg. of betaine salicylate. This dosage may be adjusted to the needs of the infant by appropriate reduction according to body weight.

It is preferable to use a hydroalcoholic vehicle for the purposes of preparing a liquid preparation of betaine salicylate. Iso-alcoholic elixir may be utilized or any suitable mixture of ethanol and water, wherein the alcohol concentration is at least 20 percent by weight. A satisfactory formula for such a preparation is as follows:

Dissolve ten grams of betaine salicylate in 300 cc. of 95 percent ethanol and bring to the desired volume of one liter with simple syrup, U.S.P. One teaspoonful (5 cc.) of this solution supplies 50 mgs. of the therapeutic compound. By appropriate administration of from three to six teaspoonfuls daily, an elevated blood level of salicylate ion results, without gastrointestinal intolerance or other noxious side-reactions.

If it is desired to administer this salicylate compound by the oral route utilizing a solid dose form, then tablets or capsules may be prepared. An advantage of betaine salicylate is its unique stability and lack of hygroscopicity. The stability of this compound under the required manufacturing and storage conditions, permits the manufacturing of tablets and capsules by conventional means without use of special techniques.

When tablets and capsules are used as a dose form for the administration of these new salicylates, the dose range may be adjusted so that each tablet or capsule contains a therapeutic quantity of from 50 mg. to 500 mg. of the appropriate compound. Since no special drying fillers or absorbents are required, the resultant tablet size of even the 500 mg. dosage permits easy swallowing.

Because betaine salicylate is non-irritating to mucosal membranes, it may be conveniently administered by the suppository route. Two-gram suppositories, containing at least 100 mgs. of betaine salicylate may be prepared, using either cocoa butter or the known water-miscible suppository bases. Repetitive administration will not cause local tissue irritation and will provide rapid absorption with consequent increased blood salicylate level which is desirable for therapeutic purposes.

It is not desired to be limited except as set forth in the following claims, the above description being by way of illustration of the invention.

What is claimed is:
1. Betaine salicylate.
2. The method of elevating blood salicylate levels which consists of administering betaine salicylate.
3. A therapeutic preparation in unit dosage form which comprises from 50 to 500 mg. of betaine salicylate and a pharmaceutical carrier therefor.
4. A therapeutic tablet in unit dosage form which comprises from 50 to 500 mg. of betaine salicylate and a pharmaceutical carrier therefor.
5. A liquid therapeutic preparation which comprises betaine salicylate in a non-toxic alcoholic medium wherein the alcohol concentration is at least 20 percent by weight.
6. The method of preparing betaine salicylate which consists of reacting betaine base moiety with salicylic acid moiety in an anhydrous inert organic solvent.

7. The method of claim 6 wherein said inert organic solvent is selected from the class of alcohols conforming to the formula ROH wherein R consists of an alkyl group of from one through five carbons.

8. The method of claim 6 wherein the betaine base moiety is betaine itself and the salicylic acid moiety is salicylic acid itself, there being an excess of betaine.

9. The method of claim 6 wherein the betaine base moiety is supplied by a salt of betaine and the salicylic acid moiety is supplied by a metal salicylate.

References Cited in the file of this patent

UNITED STATES PATENTS 2,101,867    Miller et al. _____ Dec. 14, 1937

OTHER REFERENCES

Gross et al.: "The Salicylates," 1948, Hillhouse Press, New Haven, pp. 59–60.

Jenkins et al.: "The Chemistry of Organic Medicinal Products," 4th Ed. (1957), John Wiley and Sons, N.Y., pp. 239–240.

Karrer: "Organic Chemistry," Second English Edition (1946), Elsevier Publishing Co., New York, p. 283.